(12) United States Patent
Lim et al.

(10) Patent No.: US 11,476,459 B2
(45) Date of Patent: Oct. 18, 2022

(54) LITHIUM SECONDARY BATTERY HAVING IMPROVED HIGH-TEMPERATURE STORAGE CHARACTERISTICS

(71) Applicant: LG Chem, Ltd., Seoul (KR)

(72) Inventors: Young Min Lim, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 239 days.

(21) Appl. No.: 16/635,371

(22) PCT Filed: Jan. 25, 2019

(86) PCT No.: PCT/KR2019/001127
§ 371 (c)(1),
(2) Date: Jan. 30, 2020

(87) PCT Pub. No.: WO2019/151724
PCT Pub. Date: Aug. 8, 2019

(65) Prior Publication Data
US 2021/0075011 A1   Mar. 11, 2021

(30) Foreign Application Priority Data

Jan. 30, 2018 (KR) .......... 10-2018-0011217
Jan. 24, 2019 (KR) .......... 10-2019-0009127

(51) Int. Cl.
| | | |
|---|---|---|
| H01M 4/505 | (2010.01) |
| H01M 4/525 | (2010.01) |
| H01M 10/0525 | (2010.01) |
| H01M 10/0567 | (2010.01) |
| H01M 10/0568 | (2010.01) |
| H01M 10/0569 | (2010.01) |

(52) U.S. Cl.
CPC .......... *H01M 4/505* (2013.01); *H01M 4/525* (2013.01); *H01M 10/0525* (2013.01); *H01M 10/0567* (2013.01); *H01M 10/0568* (2013.01); *H01M 10/0569* (2013.01); *H01M 2300/0028* (2013.01)

(58) Field of Classification Search
CPC .......... H01M 2300/0025–0042; H01M 10/0566–0569
See application file for complete search history.

(56) References Cited

U.S. PATENT DOCUMENTS

| | | |
|---|---|---|
| 2008/0305402 A1 | 12/2008 | Kato et al. |
| 2010/0099031 A1 | 4/2010 | Kato et al. |
| 2012/0308881 A1 | 12/2012 | Tokuda et al. |
| 2014/0272604 A1 | 9/2014 | Lim et al. |
| 2015/0340736 A1 | 11/2015 | Kim et al. |
| 2017/0069935 A1 | 3/2017 | Choi et al. |
| 2018/0019498 A1 | 1/2018 | Sakaguchi et al. |
| 2018/0138551 A1 | 5/2018 | Miyasato et al. |
| 2020/0287241 A1* | 9/2020 | Morinaka ......... H01M 10/0569 |

FOREIGN PATENT DOCUMENTS

| | | |
|---|---|---|
| CN | 106450461 A | 2/2017 |
| EP | 2882029 A1 | 6/2015 |
| JP | 2017117684 A | 6/2017 |
| KR | 101338814 B1 | 12/2013 |
| KR | 20140104383 A | 8/2014 |
| KR | 20160036810 A | 4/2016 |
| KR | 20160043149 A | 4/2016 |
| KR | 20170028677 A | 3/2017 |
| KR | 20170061028 A | 6/2017 |
| KR | 20170110995 A | 10/2017 |
| KR | 204170115512 A | 10/2017 |

OTHER PUBLICATIONS

Extended European Search Report for Application No. 19747419.0 dated Jan. 13, 2021, 5 pages.
International Search Report for Application No. PCT/KR2019/001127, dated Apr. 29, 2019, pp. 1-2.
Search Report dated Aug. 15, 2022 from Office Action for Chinese Application No. 201980003760.9 dated Aug. 22, 2022. 2 pgs.

* cited by examiner

*Primary Examiner* — Eric R Smith
(74) *Attorney, Agent, or Firm* — Lerner, David, Littenberg, Krumholz & Mentlik, LLP

(57) ABSTRACT

A lithium battery is disclosed herein. In some embodiments, a lithium secondary battery includes a positive electrode, a negative electrode, and a separator disposed between the positive electrode and the negative electrode, and a non-aqueous electrolyte solution, wherein the positive electrode includes a positive electrode active material represented by Formula 1, and the non-aqueous electrolyte solution includes a non-aqueous organic solvent, a lithium salt, and an additive, wherein the additive is a mixed additive which includes lithium difluorophosphate, tetravinylsilane, and a sultone compound in a weight ratio of 1:0.05:0.1 to 1:1:1.5:

$$Li(Ni_aCo_bMn_c)O_2 \quad \text{[Formula 1]}$$

wherein, in Formula 1,
$0.65 < a \le 0.9$, $0.05 \le b < 0.2$, $0.05 \le c < 0.2$, and $a+b+c=1$.

11 Claims, No Drawings

LITHIUM SECONDARY BATTERY HAVING IMPROVED HIGH-TEMPERATURE STORAGE CHARACTERISTICS

CROSS-REFERENCE TO RELATED APPLICATIONS

The present application is a national phase entry under 35 U.S.C. § 371 of International Application No. PCT/KR2019/001127, filed on Jan. 25, 2019, which claims priority from Korean Patent Application Nos. 10-2018-0011217, filed on Jan. 30, 2018, and 10-2019-0009127, filed on Jan. 24, 2019, the disclosures of which are incorporated by reference herein.

TECHNICAL FIELD

The present invention relates to a lithium secondary battery having improved high-temperature storage characteristics.

BACKGROUND ART

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

Particularly, there emerges an interest in rechargeable secondary batteries among these electrochemical devices, and lithium secondary batteries developed in the early 1990's are spotlighted among the rechargeable secondary batteries because the lithium secondary batteries are advantageous in that they have higher operating voltage and significantly higher energy density.

A lithium secondary battery currently used is composed of a negative electrode capable of intercalating and deintercalating lithium ions, a positive electrode formed of a lithium-containing transition metal oxide, and a non-aqueous electrolyte solution in which a lithium salt is dissolved in a carbonate-based organic solvent.

Charge and discharge of a lithium secondary battery is possible because lithium ions, which are discharged from the positive electrode by charging, transfer energy while a phenomenon is repeated in which the lithium ions are intercalated into the negative electrode and deintercalated during discharging.

With respect to the lithium secondary battery, a layer is formed on a surface of the negative electrode while some of electrolyte solution additive components and organic solvents are decomposed in a voltage range of 0.5 V to 3.5 V during initial charge, and lithium ions react with the electrolyte solution on the surface of the negative electrode to form compounds, such as $Li_2CO_3$, $Li_2O$, and $LiOH$, while the lithium ions generated from the positive electrode move to the negative electrode. These compounds may form a kind of a passivation layer on the surface of the negative electrode, and the layer is denoted as a "solid electrolyte interface (SEI)" layer.

The SEI layer formed at an initial stage of charging acts as a protective film for stabilizing the battery by suppressing the decomposition of the carbonate-based electrolyte solution on the surface of the negative electrode.

However, since the SEI layer only formed by the organic solvent and the lithium salt is rather insufficient to act as a persistent protective film, the SEI layer may be gradually collapsed by increased electrochemical energy and thermal energy during continuous charge and discharge of the battery, particularly, during high-temperature storage in a fully charged state. A side reaction continuously occurs in which a surface of a negative electrode active material exposed due to the collapse of the SEI layer and the electrolyte solution solvent are reacted and decomposed, and, as a result, deterioration of battery characteristics, such as a decrease in capacity of the battery, a reduction in lifetime, and an increase in resistance, occurs. In addition, the side reaction causes generation of gases, such as $CO$, $CO_2$, $CH_4$, and $C_2H_6$, in the battery, wherein the continuous gas generation may not only cause an expansion of a battery thickness by increasing internal pressure of the lithium secondary battery at a high temperature, but may also eventually reduce safety of the secondary battery.

PRIOR ART DOCUMENT

Japanese Patent Application Laid-open Publication No. 2017-117684

DISCLOSURE OF THE INVENTION

Technical Problem

An aspect of the present invention provides a lithium secondary battery in which capacity characteristics may be secured even during high-temperature storage by including a non-aqueous electrolyte solution capable of forming a robust film on the surface of an electrode.

Technical Solution

According to an aspect of the present invention, there is provided a lithium secondary battery including a positive electrode, a negative electrode, a separator disposed between the positive electrode and the negative electrode, and a non-aqueous electrolyte solution, wherein the positive electrode includes a positive electrode active material represented by Formula 1 below, and the non-aqueous electrolyte solution includes a non-aqueous organic solvent, a lithium salt, and an additive, wherein the additive is a mixed additive which includes lithium difluorophosphate (LiDFP), tetravinylsilane (TVS), and a sultone compound in a weight ratio of 1:0.05:0.1 to 1:1:1.5.

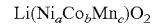   [Formula 1]

In Formula 1, 0.65<a≤0.9, 0.05≤b<0.2, 0.05≤c<0.2, and a+b+c=1.

The positive electrode active material may be a lithium transition metal oxide represented by Formula 1a below.

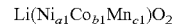   [Formula 1a]

In Formula 1a, 0.78≤a1<0.9, 0.05<b1<0.17, 0.05<c1<0.17, and a1+b1+c1=1.

Specifically, the positive electrode active material may include $Li(Ni_{0.8}Mn_{0.1}Co_{0.1})O_2$.

Also, the non-aqueous organic solvent included in the non-aqueous electrolyte solution may include a cyclic carbonate-based organic solvent and a linear carbonate-based organic solvent. Specifically, the cyclic carbonate-based organic solvent and the linear carbonate-based organic solvent may be included in a weight ratio of 1:1 to 1:4.

Furthermore, a weight ratio of the lithium difluorophosphate the tetravinylsilane the sultone compound may be in a range of 1:0.07:0.3 to 1:0.7:1, for example, 1:0.1:0.5 to 1:0.5:0.8.

In this case, the sultone compound may include at least one selected from the group consisting of 1,3-propane sultone, 1,4-butane sultone, and 1,3-propene sultone, and may specifically be 1,3-propane sultone.

An amount of the additive may be in a range of 0.1 wt % to 7 wt %, for example, 0.1 wt % to 5 wt % based on a total weight of the non-aqueous electrolyte solution.

Also, the non-aqueous electrolyte solution may further include at least one additional additive selected from the group consisting of vinylene carbonate, ethylene sulfate (Esa), trimethylene sulfate (TMS), methyl trimethylene sulfate (MTMS), lithium difluoro(bisoxalato)phosphate, lithium difluorophosphate, lithium oxalyldifluoroborate, succinonitrile, and $LiBF_4$.

Advantageous Effects

According to the present invention, since a non-aqueous electrolyte solution capable of forming a robust film on the surface of a positive electrode by including a transition metal oxide with high nickel (Ni) content during initial charge is included, high energy density may not only be secured to improve output characteristics, but a side reaction between the electrode and the non-aqueous electrolyte solution may also be suppressed during high-temperature storage to suppress a resistance increase rate and a thickness increase rate, and thus, a lithium secondary battery having improved stability may be prepared.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, there is provided a lithium secondary battery including a positive electrode, a negative electrode, a separator disposed between the positive electrode and the negative electrode, and a non-aqueous electrolyte solution, wherein the positive electrode includes a positive electrode active material represented by Formula 1 below, and the non-aqueous electrolyte solution includes a non-aqueous organic solvent, a lithium salt, and an additive, wherein the additive is a mixed additive which includes lithium difluorophosphate (LiDFP), tetravinylsilane (TVS), and a sultone compound in a weight ratio of 1:0.05:0.1 to 1:1:1.5.

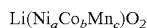 [Formula 1]

In Formula 1,
0.65<a≤0.9, 0.05≤b<0.2, 0.05≤c<0.2, and a+b+c=1.

The lithium secondary battery of the present invention may be prepared by forming an electrode assembly, in which the positive electrode, the negative electrode, and the separator disposed between the positive electrode and the negative electrode are sequentially stacked, and adding an electrolyte, in which the lithium salt is dissolved, thereto, and, in this case, the positive electrode, the negative electrode, and the separator, which constitute the lithium secondary battery of the present invention, may be prepared according to a conventional method known in the art and used.

(1) Positive Electrode

First, the positive electrode may be prepared by forming a positive electrode material mixture layer on a positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode material mixture layer may be formed by coating the positive electrode collector with a positive electrode slurry including a positive electrode active material, a binder, a conductive agent, and a solvent, and then drying and rolling the coated positive electrode collector.

In this case, the positive electrode active material may include a high capacity transition metal oxide represented by Formula 1, for example, a lithium transition metal oxide represented by Formula 1a to increase energy density.

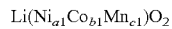 [Formula 1a]

In Formula 1a,
0.78≤a1<0.9, 0.05<b1<0.17, 0.05<c1<0.17, and a1+b1+c1=1.

Since the lithium secondary battery of the present invention may secure high energy density by including a positive electrode including the transition metal oxide with high nickel (Ni) content, in which the Ni content is greater than 0.65 as in Formula 1, as a positive electrode active material, output characteristics of the lithium secondary battery may be improved.

The positive electrode active material may include $Li(Ni_{0.8}Mn_{0.1}Co_{0.1})O_2$ as a typical example.

With respect to a high-Ni oxide having a Ni content greater than 0.65 as the compound represented by Formula 1, since sizes of $Li^{+1}$ ion and $Ni^{+2}$ ion are similar to each other, a cation mixing phenomenon occurs in which positions of the $Li^{+1}$ ion and the $Ni^{+2}$ ion are changed each other in a layered structure of the positive electrode active material during charge and discharge process. That is, a nickel transition metal having a d orbital must have an octahedron structure during coordinate bonding in an environment, such as a high temperature, according to a change in oxidation number of Ni contained in the positive electrode active material, but a crystal structure of the positive electrode active material may be deformed and collapsed while a twisted octahedron is formed by a non-uniform reaction in which the order of the energy level is reversed or the oxidation number is changed by external energy supply. Furthermore, since another side reaction, in which a transition metal, particularly, a nickel metal is dissolved from the positive electrode active material, occurs due to a side reaction between the positive electrode active material and the electrolyte solution during high-temperature storage, overall performance of the secondary battery is degraded due to the structural collapse of the positive electrode active material along with the depletion of the electrolyte solution.

Thus, with respect to the lithium secondary battery of the present invention, since the positive electrode including the transition metal oxide represented by Formula 1 as a positive electrode active material as well as the non-aqueous electrolyte solution including an additive with a specific configuration is used, a robust ion conductive film is formed on a surface of the positive electrode to suppress the cation mixing phenomenon of the $Li^{+1}$ ion and the $Ni^{+2}$ ion and to effectively suppress the side reaction between the positive electrode and the electrolyte solution and the metal dissolution phenomenon, and thus, the structural instability of the high-capacity electrode may be alleviated. Therefore, since the sufficient amount of the nickel transition metal for ensuring the capacity of the lithium secondary battery may be secured, the energy density may be increased to prevent a decrease in output characteristics.

In addition to the lithium-nickel-manganese-cobalt-based oxide having a Ni content greater than 0.65, the positive electrode active material is a compound capable of reversibly intercalating and deintercalating lithium, wherein the positive electrode active material may further include at least one compound selected from lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-y}Mn_yO_2$ (where $0<Y<1$), $LiMn_{2-z}Ni_zO_4$ (where $0<Z<2$), etc.), lithium-nickel-cobalt-based oxide (e.g., $LiNi_{1-y1}Co_{y1}O_2$ (where $0<Y1<1$), lithium-manganese-cobalt-based oxide (e.g., $LiCo_{1-y2}Mn_{y2}O_2$ (where $0<Y2<1$), $LiMn_{2-z1}Co_{z1}O_4$ (where $0<Z1<2$), etc.), and lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.).

Specifically, the positive electrode active material may include $LiCoO_2$, $LiMnO_2$, $LiNiO_2$, or a lithium nickel cobalt manganese oxide having a nickel content of 0.65 or less (e.g., $Li(Ni_{1/3}Mn_{1/3}Co_{1/3})O_2$, $Li(Ni_{0.6}Mn_{0.2}Co_{0.2})O_2$, or $Li(Ni_{0.5}Mn_{0.3}Co_{0.2})O_2$).

The positive electrode active material may be included in an amount of 80 wt % to 99.5 wt %, for example, 85 wt % to 95 wt %, based on a total weight of solid content in the positive electrode slurry. If the amount of the positive electrode active material is less than 80 wt %, the energy density may be decreased to reduce the capacity.

Also, the binder, as a component of the positive electrode slurry, is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer, a styrene-butadiene rubber, a fluoro rubber, various copolymers, and the like.

Furthermore, any conductive agent may be used as the conductive agent, as a component of the positive electrode slurry, without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The conductive agent may have an average particle diameter ($D_{50}$) of 10 μm or less, particularly 0.01 μm to 10 μm, and more particularly 0.01 μm to 1 μm. In a case in which the average particle diameter of the conductive agent is greater than 10 μm, it is not desirable because an effect of improving conductivity by adding graphite powder is insignificant due to poor dispersibility.

Also, the solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the positive electrode slurry including the positive electrode active material as well as selectively the binder and the conductive agent is in a range of 10 wt % to 60 wt %, for example, 20 wt % to 50 wt %.

(2) Negative Electrode

Also, the negative electrode may be prepared by forming a negative electrode material mixture layer on a negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode material mixture layer may be formed by coating the negative electrode collector with a negative electrode slurry including a negative electrode active material, a binder, a conductive agent, and a solvent, and then drying and rolling the coated negative electrode collector.

The negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$, $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

Also, the binder, as a component of the negative electrode slurry, is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 70 wt %.

(3) Separator

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

(4) Non-aqueous Electrolyte Solution

Also, the lithium secondary battery according to the embodiment of the present invention may include a non-aqueous electrolyte solution including (i) a non-aqueous organic solvent, (ii) a lithium salt, and (iii) an additive.

(i) Non-Aqueous Organic Solvent

As the non-aqueous organic solvent, a component of the non-aqueous electrolyte solution, it is desirable to use a carbonate-based solvent to exhibit desired characteristics with the additive while minimizing decomposition due to an oxidation reaction during charge and discharge of the secondary battery.

Particularly, in order to secure high electrical conductivity, a cyclic carbonate-based organic solvent having a high dielectric constant and a linear carbonate-based organic solvent having a low dielectric constant among the carbonate-based solvents may be mixed and used.

Specifically, the cyclic carbonate-based organic solvent and the linear carbonate-based organic solvent may be included in a weight ratio of 1:1 to 1:4, for example, 1:2 to 1:4.

In a case in which the weight ratio of the linear carbonate-based organic solvent to the cyclic carbonate-based organic solvent is less than 1, since an amount of the cyclic carbonate-based organic solvent with high viscosity is larger, movement of Li$^+$ is not easy, and thus, initial resistance may be increased to reduce the output characteristics. Particularly, a large amount of gas may be generated during high-temperature storage. Also, in a case in which the weight ratio of the linear carbonate-based organic solvent to the cyclic carbonate-based organic solvent is greater than 4, since the amount of the cyclic carbonate-based organic solvent forming a solid electrolyte interface (SEI) is decreased, an initial SEI forming effect and regeneration of the SEI during operation are reduced, and thus, cycle characteristics may be degraded.

Specific examples of the cyclic carbonate-based organic solvent may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC).

Also, as specific examples of the linear carbonate-based organic solvent, at least one selected from the group consisting of dimethyl carbonate (DMC), diethyl carbonate (DEC), dipropyl carbonate, ethylmethyl carbonate (EMC), methylpropyl carbonate, and ethylpropyl carbonate may be used, but the linear carbonate-based organic solvent is not limited thereto.

Also, the non-aqueous organic solvent may further include a linear ester-based organic solvent to improve output and high-temperature characteristics.

In this case, the linear carbonate-based organic solvent and the linear ester-based organic solvent may be included in a weight ratio of 1:0.2 to 1:1.

In a case in which the linear ester-based organic solvent is included within the above amount range, the output characteristics and high-temperature storage characteristics of the secondary battery may be improved.

Specific examples of the linear ester-based organic solvent may be at least one selected from the group consisting of methyl acetate, ethyl acetate, propyl acetate, methyl propionate, ethyl propionate, propyl propionate, and butyl propionate, but the linear ester-based organic solvent is not limited thereto.

The non-aqueous organic solvent may further include a cyclic ester-based organic solvent.

The cyclic ester-based organic solvent may be included in a weight ratio of less than 1:1 with respect to the linear ester-based organic solvent.

Specific examples of the cyclic ester-based organic solvent may be at least one selected from the group consisting of γ-butyrolactone, γ-valerolactone, γ-caprolactone, σ-valerolactone, and ε-caprolactone.

(ii) Lithium Salt

Any lithium salt typically used in an electrolyte solution for a lithium secondary battery may be used as the lithium salt, as a component of the non-aqueous electrolyte solution, without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, B$_{10}$Cl$_{10}^-$, AlCl$_4^-$, AlO$_4^-$, PF$_6^-$, CF$_3$SO$_3^-$, CH$_3$CO$_2^-$, CF$_3$CO$_2^-$, AsF$_6^-$, SbF$_6^-$, CH$_3$SO$_3^-$, (CF$_3$CF$_2$SO$_2$)$_2$N$^-$, (CF$_3$SO$_2$)$_2$N$^-$, (FSO$_2$)$_2$N$^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, C$_4$F$_9$SO$_3^-$, CF$_3$CF$_2$SO$_3^-$, CF$_3$CF$_2$(CF$_3$)$_2$CO$^-$, (CF$_3$SO$_2$)$_2$CH$^-$, CF$_3$(CF$_2$)$_7$SO$_3^-$, and SCN$^-$ as an anion.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, Lithium bis(fluorosulfonyl)imide (LiFSI, LiN(SO$_2$F)$_2$), lithium bisperfluoroethanesulfonimide (LiBETI, LiN(SO$_2$CF$_2$CF$_3$)$_2$), and lithium (bis)trifluoromethanesulfonimide (LiTFSI, LiN(SO$_2$CF$_3$)$_2$), or a mixture of two or more thereof. In addition to these materials, lithium salts commonly used in electrolyte solutions of lithium secondary batteries may be used without limitation.

The lithium salt may be included in a concentration of 0.01 M to 2 M, for example, 0.01 M to 1 M in the non-aqueous electrolyte solution.

In a case in which the concentration of the lithium salt is less than 0.01 M, effects of improving low-temperature output of the lithium secondary battery and improving cycle characteristics during high-temperature storage may be insignificant, and, in a case in which the concentration of the lithium salt is greater than 2 M, viscosity of the non-aqueous electrolyte solution may be increased to reduce wettability of the non-aqueous electrolyte solution.

(iii) Additive

The non-aqueous electrolyte solution may include a mixed additive, in which lithium difluorophosphate, tetravinylsilane, and a sultone compound are mixed, as the additive.

For example, with respect to a lithium secondary battery which includes a non-aqueous electrolyte solution including a conventional carbonate-based organic solvent, an effect of improving output characteristics may be secured by forming a robust and thin SEI on surfaces of a positive electrode and a negative electrode.

However, since the positive electrode and/or the negative electrode are exposed to cause a side reaction with the electrolyte solution while the SEI dissociates or the electrolyte solution is decomposed and depleted during high-temperature storage and/or in an extreme environment, structural collapse of the positive electrode and/or the negative electrode may occur.

Thus, in the present invention, a more robust ion conductive film may be formed on the surfaces of the positive electrode and the negative electrode by including the non-aqueous electrolyte solution including the mixed additive, and, accordingly, output characteristics may be secured and the side reaction between the electrode and the electrolyte solution may be simultaneously prevented to prepare a lithium secondary battery having more improved high-temperature storage characteristics and high-temperature cycle characteristics.

In this case, a weight ratio of the lithium difluorophosphate the tetravinylsilane the sultone compound may be in a range of 1:0.05:0.1 to 1:1:1.5, particularly 1:0.07:0.3 to 1:0.7:1, and more particularly 1:0.1:0.5 to 1:0.5:0.8.

In a case in which each component of the additive is mixed in the above ratio in the non-aqueous electrolyte solution of the present invention, a secondary battery having more improved overall performance may be prepared.

Specifically, the lithium difluorophosphate, as one of additive components of the non-aqueous electrolyte solution, is a component for achieving an effect of improving long-term life characteristics of the secondary battery, wherein, since it is electrochemically decomposed on the surfaces of the positive electrode and the negative electrode to help the formation of the ion conductive film, it may suppress metal dissolution from the positive electrode and may prevent the side reaction between the electrode and the electrolyte solution to achieve an effect of improving high-temperature storage characteristics and cycle life characteristics of the secondary battery.

It is desirable that the lithium difluorophosphate is included in an amount of less than 2 wt % based on a total weight of the non-aqueous electrolyte solution. In a case in which the amount of the lithium difluorophosphate is 2 wt % or more, since the lithium difluorophosphate is not dissolved in the non-aqueous electrolyte solution, but is present in the form of precipitates, resistance of the battery may be increased or the side reaction in the electrolyte solution may excessively occur during charge and discharge to reduce cycle life of the secondary battery.

Also, the tetravinylsilane, as one of the additive components, is a component for improving stability during the high-temperature storage of the secondary battery, wherein, since a robust ion conductive film may be formed on the surfaces of the positive electrode and the negative electrode through physical adsorption and electrochemical reaction when the tetravinylsilane is included, the side reaction with the electrolyte solution during high-temperature storage and the resulting increase in the resistance may be suppressed by the tetravinylsilane.

The tetravinylsilane may be included in a weight ratio of 0.05 or more to 1 or less with respect to the lithium difluorophosphate, and, in a case in which the tetravinylsilane is included in an amount within the above range, a gas generation reducing effect and a stabilization effect during the formation of the SEI may not only be obtained, but degradation of the cycle life characteristics may also be prevented by preventing the increase in the resistance of the secondary battery.

The sultone compound, as one of the additive components, is a component for improving high-temperature stability, wherein, in a case in which the sultone compound is included, a stable protective layer that does not crack even during high-temperature storage may be formed on the surface of the negative electrode in addition to the SEI. The negative electrode coated with the protective layer may suppress gas generation by suppressing the decomposition of the non-aqueous solvent by the negative electrode active material during high-temperature storage even when a highly crystallized carbon material, such as natural graphite or artificial graphite, is used in the negative electrode. Furthermore, the protective layer does not interfere with a normal reaction of charge and discharge of the battery. Thus, performance, such as room-temperature and high-temperature cycle life, capacity, and resistance, of the secondary battery may be improved.

Typical examples of the sultone compound may be at least one selected from the group consisting of 1,3-propane sultone (PS), 1,4-butane sultone, and 1,3-propene sultone (PPS), and may specifically be at least one selected from 1,3-propane sultone (PS) and 1,3-propene sultone (PPS), and the sultone compound may more specifically include 1,3-propane sultone.

The sultone compound may be included in a weight ratio of 0.1 or more to 1.5 or less with respect to the lithium difluorophosphate, and, in a case in which the sultone compound is included in an amount within the above range, an effect of stabilizing the SEI may be secured without the increase in the resistance, and the high-temperature storage characteristics and cycle life characteristics of the secondary battery may be improved by suppressing the side reaction with the electrolyte solution.

Particularly, the sultone compound may be included in an amount of up to 4 wt % or less, for example, 3 wt % or less based on the total weight of the non-aqueous electrolyte solution. In a case in which the total amount of the sultone compound in the non-aqueous electrolyte solution is greater than 4 wt %, since an excessively thick film may be formed, resistance may be increased and output may be degraded.

Also, in the lithium secondary battery according to the embodiment of the present invention, the mixed additive may be included in an amount of 0.1 wt % to 7 wt %, particularly 0.1 wt % to 5 wt %, and more particularly 0.1 wt % to 3.5 wt % based on the total weight of the non-aqueous electrolyte solution.

If the amount of the additive is less than 0.1 wt %, effects of improving low-temperature output, high-temperature storage characteristics, and high-temperature life characteristics of the battery may be insignificant, and, if the amount of the additive is greater than 7 wt %, there is possibility that a side reaction may occur during charge and discharge of the battery by the surplus additives. Particularly, since the additives may not be sufficiently decomposed, but may be present in the form of an unreacted material or precipitates in the electrolyte solution at room temperature when the additives are excessively added, the resistance may be increased to degrade the cycle life characteristics of the secondary battery.

As described above, in an embodiment of the present invention, since a stable ion conductive film or protective layer is formed on the surfaces of the positive electrode and the negative electrode while complementing the functions of each additive by adjusting the type and amount range of the mixed additive, capacity, output, and cycle life retention at high temperature of the secondary battery may be efficiently controlled by suppressing the side reaction with the electrolyte solution.

(vi) Additional Additive

Also, the lithium secondary battery according to the embodiment of the present invention may further include additional additives in the non-aqueous electrolyte solution, if necessary, in order to prevent the occurrence of the collapse of the negative electrode due to the decomposition in a high power environment or to further improve low-temperature high rate discharge characteristics, high-temperature stability, overcharge prevention, and an effect of suppressing battery expansion at high temperature.

The additional additive may include at least one selected from the group consisting of vinylene carbonate, vinyl ethylene carbonate, ethylene sulfate (Esa), trimethylene sulfate (TMS), methyl trimethylene sulfate (MTMS), lithium difluoro(bisoxalato)phosphate, lithium difluorophosphate, lithium oxalyldifluoroborate, succinonitrile (SN), and $LiBF_4$.

Among these additional additives, vinylene carbonate, vinylethylene carbonate, or succinonitrile may form a stable SEI on the surface of the negative electrode together with the lithium difluorophosphate during an initial activation process of the secondary battery.

The $LiBF_4$ may improve high-temperature stability of the secondary battery by suppressing the generation of gas which may be generated due to the decomposition of the electrolyte solution during high-temperature storage.

Two or more of the additional additives may be mixed and included, and the additional additives may be included in an amount of 0.01 wt % to 5 wt %, particularly 0.01 wt % to 3 wt %, and more particularly 0.05 wt % to 3 wt % based on the total weight of the non-aqueous electrolyte solution including the mixed additive. If the amount of the additional additives is less than 0.01 wt %, effects of improving low-temperature output, high-temperature storage characteristics, and high-temperature life characteristics of the battery may be insignificant, and, if the amount of the additional additives is greater than 5 wt %, there is possibility that the side reaction in the electrolyte solution may excessively occur during charge and discharge of the battery. Particularly, since the additional additives may not be sufficiently decomposed at high temperature when the additional additives are excessively added, the additional additives may be present in the form of an unreacted material or precipitates in the electrolyte solution at room temperature. Accordingly, a side reaction, by which life or resistance characteristics of the secondary battery are reduced, may occur.

As described above, since the lithium secondary battery of the present invention may secure output characteristics and may simultaneously form a robust SEI on the surface of the negative electrode by including the non-aqueous electrolyte solution containing the mixed additive, in which three types of compounds are mixed in a specific ratio, as well as the positive electrode including the transition metal oxide with high Ni content as a positive electrode active material, a lithium secondary battery having improved high-temperature storage characteristics and cycle life characteristics may be prepared.

A shape of the lithium secondary battery of the present invention is not particularly limited, but the lithium secondary battery may be used in various forms, such as a cylindrical type, a prismatic type, a pouch type, or a coin type, depending on the purpose. The lithium secondary battery according to the embodiment of the present invention may be a pouch-type secondary battery.

EXAMPLES

Example 1

(Non-Aqueous Electrolyte Solution Preparation)

A non-aqueous electrolyte solution of the present invention was prepared by adding 1.15 g of an additive (lithium difluorophosphate (LiDFP):tetravinylsilane (TVS):1,3-propane sultone (PS)=weight ratio of 1:0.05:0.1) to 98.85 g of a non-aqueous organic solvent (ethylene carbonate (EC):ethyl methyl carbonate (EMC)=volume ratio of 3:7) in which 1 M $LiPF_6$ was dissolved (see Table 1 below).

(Secondary Battery Preparation)

A positive electrode active material ($Li(Ni_{0.8}Mn_{0.1}Co_{0.1})O_2$), a conductive agent (carbon black), and a binder (polyvinylidene fluoride) were added to N-methyl-2-pyrrolidone (NMP) at a weight ratio of 90:5:5 to prepare a positive electrode slurry (solid content of 50 wt %). A 20 μm thick positive electrode collector (Al thin film) was coated with the positive electrode slurry, dried, and roll-pressed to prepare a positive electrode.

Subsequently, a negative electrode active material (artificial graphite), a conductive agent (carbon black), and a binder (polyvinylidene fluoride) were added to N-methyl-2-pyrrolidone (NMP) at a weight ratio of 90:5:5 to prepare a negative electrode slurry (solid content of 60 wt %). A 20 μm thick negative electrode collector (Cu thin film) was coated with the negative electrode slurry, dried, and roll-pressed to prepare a negative electrode.

Next, after a coin-type battery was prepared by a typical method in which the above-prepared positive electrode, a polyethylene porous film, and the negative electrode were sequentially stacked, the above-prepared non-aqueous electrolyte solution was injected to prepare a lithium secondary battery (battery capacity 340 mAh).

Example 2

A non-aqueous electrolyte solution and a lithium secondary battery including the same were prepared in the same manner as in Example 1 except that 3.5 g of an additive (LiDFP:TVS:PS=weight ratio of 1:1:1.5) was added to 96.5 g of a non-aqueous organic solvent during the preparation of the non-aqueous electrolyte solution (see Table 1 below).

Example 3

A non-aqueous electrolyte solution and a lithium secondary battery including the same were prepared in the same manner as in Example 1 except that 2.1 g of an additive (LiDFP:TVS:PS=weight ratio of 1:1:0.1) was added to 97.9 g of a non-aqueous organic solvent during the preparation of the non-aqueous electrolyte solution (see Table 1 below).

Example 4

A non-aqueous electrolyte solution and a lithium secondary battery including the same were prepared in the same manner as in Example 1 except that 2.55 g of an additive (LiDFP:TVS:PS=weight ratio of 1:0.05:1.5) was included in 97.45 g of a non-aqueous organic solvent during the preparation of the non-aqueous electrolyte solution (see Table 1 below).

Example 5

A non-aqueous electrolyte solution and a lithium secondary battery including the same were prepared in the same manner as in Example 1 except that 2.7 g of an additive (LiDFP:TVS:PS=weight ratio of 1.5:0.2:1) was included in 97.3 g of a non-aqueous organic solvent during the preparation of the non-aqueous electrolyte solution (see Table 1 below).

Example 6

A non-aqueous electrolyte solution and a lithium secondary battery including the same were prepared in the same manner as in Example 1 except that 3 g of an additive (LiDFP:TVS:PS=weight ratio of 1.5:1:0.5) was included in 97 g of a non-aqueous organic solvent during the preparation of the non-aqueous electrolyte solution (see Table 1 below).

Comparative Example 1

A non-aqueous electrolyte solution and a lithium secondary battery including the same were prepared in the same manner as in Example 1 except that 3 g of vinylene carbonate (VC) was included in 97 g of a non-aqueous organic solvent during the preparation of the non-aqueous electrolyte solution (see Table 1 below).

Comparative Example 2

A non-aqueous electrolyte solution and a lithium secondary battery including the same were prepared in the same manner as in Example 1 except that 2.0 g of $LiBF_4$ was included in 98 g of a non-aqueous organic solvent during the preparation of the non-aqueous electrolyte solution (see Table 1 below).

Comparative Example 3

A non-aqueous electrolyte solution and a lithium secondary battery including the same were prepared in the same manner as in Example 1 except that 4.0 g of an additive (LiDFP:TVS:PS=weight ratio of 1:1:3) was included in 96 g of a non-aqueous organic solvent during the preparation of the non-aqueous electrolyte solution (see Table 1 below).

Comparative Example 4

A non-aqueous electrolyte solution and a lithium secondary battery including the same were prepared in the same manner as in Example 1 except that 4.5 g of an additive (LiDFP:TVS:PS=weight ratio of 1:2:1.5) was included in 95.5 g of a non-aqueous organic solvent during the preparation of the non-aqueous electrolyte solution (see Table 1 below).

Comparative Example 5

A non-aqueous electrolyte solution and a lithium secondary battery including the same were prepared in the same manner as in Example 1 except that 2.15 g of an additive (LiDFP:TVS:PS=weight ratio of 2:0.05:0.1) was included in 97.85 g of a non-aqueous organic solvent during the preparation of the non-aqueous electrolyte solution (see Table 1 below).

Comparative Example 6

A non-aqueous electrolyte solution and a lithium secondary battery including the same were prepared in the same manner as in Example 1 except that 2.5 g of an additive (LiDFP:TVS:PS=weight ratio of 1:0:1.5) was included in 97.5 g of a non-aqueous organic solvent during the preparation of the non-aqueous electrolyte solution (see Table 1 below).

Comparative Example 7

A non-aqueous electrolyte solution and a lithium secondary battery including the same were prepared in the same manner as in Example 1 except that 2.5 g of an additive (LiDFP:TVS:PS=weight ratio of 0:1:1.5) was included in 97.5 g of a non-aqueous organic solvent during the preparation of the non-aqueous electrolyte solution (see Table 1 below).

Comparative Example 8

A non-aqueous electrolyte solution and a lithium secondary battery including the same were prepared in the same manner as in Example 1 except that 2.0 g of an additive (LiDFP:TVS:PS=weight ratio of 1:1:0) was included in 98 g of a non-aqueous organic solvent during the preparation of the non-aqueous electrolyte solution (see Table 1 below).

Comparative Example 9

(Secondary Battery Preparation)

A positive electrode and a lithium secondary battery including the same were prepared in the same manner as in Example 1 except that $LiCoO_2$, instead of $Li(Ni_{0.8}Mn_{0.1}Co_{0.1})O_2$, was used as a positive electrode active material (see Table 1 below).

Experimental Examples

Experimental Example 1. Performance Evaluation After High-Temperature Storage

Each of the lithium secondary batteries prepared in Examples 1 to 6 and Comparative Examples 1 to 9 was charged at 1 C to 4.25 V/55 mA under a constant current/constant voltage (CC/CV) condition at 25° C. and then discharged at a constant current (CC) of 2 C to 2.5 V.

Initial discharge capacity was measured using PNE-0506 charge/discharge equipment (manufacturer: PNE SOLUTION Co., Ltd., 5 V, 6 A). Also, a state of charge (SOC) was adjusted to 50%, and a pulse of 2.5 C was then applied for 10 seconds to calculate initial resistance through a difference between a voltage before the pulse application and a voltage after the pulse application.

Next, each secondary battery was left standing at 60° C. for 10 weeks.

Subsequently, after CC-CV charge and discharge were performed at a CC of 0.33 C after 10 weeks, discharge capacity after high-temperature storage was measured using PNE-0506 charge/discharge equipment (manufacturer: PNE SOLUTION Co., Ltd., 5 V, 6 A).

The measured initial discharge capacity and the discharge capacity measured after 10 weeks storage at high temperature were substituted into the following Equation (1) to calculate discharge capacity retention after high-temperature storage, and the results thereof are presented in Table 1 below.

Subsequently, resistance after the 10 weeks storage at high temperature was calculated using a voltage drop obtained in a state in which each of the secondary batteries was subjected to a discharge pulse at 2.5 C for 10 seconds at a SOC of 50%, the resistance was substituted into the following Equation (2) to calculate a resistance increase rate (%), and the results thereof are presented in Table 1 below. In this case, the voltage drop was calculated using PNE-0506 charge/discharge equipment (manufacturer: PNE SOLUTION Co., Ltd., 5 V, 6 A).

Discharge capacity retention (%)=(discharge capacity after high-temperature storage for 10 weeks/initial discharge capacity)×100     Equation (1):

Resistance increase rate (%)={(resistance after high-temperature storage for 10 weeks-initial resistance)/initial resistance}×100     Equation (2):

Experimental Example 2. Evaluation of Battery Thickness Increase Rate after High-Temperature Storage After initial thicknesses of the lithium secondary batteries prepared in Examples 1 to 6 and Comparative Examples 1 to 9 were measured, each of the secondary batteries was charged at 1 C to 4.25 V/55 mA under a constant current/constant voltage (CC/CV) condition at 25° C. and then discharged at a constant current (CC) of 2 C to 2.5 V.

Next, after each secondary battery was left standing at 60° C. for 10 weeks, each secondary battery was cooled at room temperature and a change in thickness after high-temperature storage was then measured using a plate thickness gauge (Mitutotyo (Japan)).

Subsequently, a thickness increase rate (%) was calculated by using the initial thickness and change in thickness after high-temperature storage measured as described above, and the results thereof are presented in Table 1 below.

Experimental Example 3. Cycle Evaluation at High Temperature

Each of the lithium secondary batteries prepared in Examples 1 to 6 and Comparative Examples 1 to 9 was charged at 1 C to 4.25 V/55 mA under a constant current/ constant voltage (CC/CV) condition at 25° C. and then discharged at a constant current of 2 C to 3.0 V. Initial discharge capacity was measured using PNE-0506 charge/discharge equipment (manufacturer: PNE SOLUTION Co., Ltd., 5 V, 6 A).

Next, each secondary battery was charged at a CC of 0.33 C to 4.20 V under a constant current-constant voltage (CC-CV) condition at 45° C., then subjected to 0.05 C current cut-off, and discharged at a CC of 0.33 C to 2.50 V. The above charging and discharging were set as one cycle, and 500 cycles of charging and discharging were performed. Discharge capacity after 500 cycles at 45° C. was measured using PNE-0506 charge/discharge equipment (manufacturer: PNE SOLUTION Co., Ltd., 5 V, 6 A).

Discharge capacity retention (%) after 500 cycles at a high temperature was calculated by using the following Equation (3), and the results thereof are presented in Table 1 below.

Discharge capacity retention (%) after 500 cycles= (discharge capacity after 500 cycles/initial discharge capacity)×100   Equation (3):

batteries prepared in Comparative Examples 1 to 4 and Comparative Examples 6 to 9.

Also, the secondary batteries prepared in Examples 1 to 6 had a resistance increase rate of 18.3% or less and a battery thickness increase rate of 18.7% or less even after 10 weeks storage at a high temperature (60° C.), wherein it may be understood that the resistance increase rates and the battery thickness increase rates were improved in comparison to those of the secondary batteries prepared in Comparative Examples 1 to 4 and Comparative Examples 6 to 9.

Furthermore, the secondary batteries prepared in Examples 1 to 6 had a discharge capacity retention (%) after 500 cycles at high temperature of 83.9% or more, wherein it may be understood that the discharge capacity retentions were better than those of the secondary batteries prepared in Comparative Examples 1 to 4 and Comparative Examples 6 to 9.

Particularly, with respect to the secondary battery of Comparative Example 9 which included $LiCoO_2$ as a positive electrode active material, since the stability of the SEI

TABLE 1

| | | Non-aqueous electrolyte solution | | | | | | After 10 weeks storage at 60 C. | | | Discharge capacity retention (%) after 500 cycles |
|---|---|---|---|---|---|---|---|---|---|---|---|
| | | Non-aqueous organic solvent | | | | | | Discharge capacity retention (%) | Resistance increase rate (%) | Battery thickness increase rate (%) | |
| | Positive electrode active material | Type | Amount added (g) | LiDFP | TVS | PS | Others | Total | | | | |
| | | | | Amount added (g) | | | | | | | | |
| Example 1 | $Li(Ni_{0.8}Mn_{0.1}Co_{0.1})O_2$ | EC:EMC = 3:7 volume ratio | 98.85 | 1.0 | 0.05 | 0.1 | — | 1.13 | 84.2 | 13.3 | 18.7 | 83.9 |
| Example 2 | $Li(Ni_{0.8}Mn_{0.1}Co_{0.1})O_2$ | EC:EMC = 3:7 volume ratio | 96.5 | 1.0 | 1.0 | 1.5 | — | 3.5 | 86.4 | 15.0 | 17.1 | 85.2 |
| Example 3 | $Li(Ni_{0.8}Mn_{0.1}Co_{0.1})O_2$ | EC:EMC = 3:7 volume ratio | 97.9 | 1.0 | 1.0 | 0.1 | — | 2.1 | 86.3 | 15.8 | 18.5 | 85.1 |
| Example 4 | $Li(Ni_{0.8}Mn_{0.1}Co_{0.1})O_2$ | EC:EMC = 3:7 volume ratio | 97.45 | 1.0 | 0.05 | 1.5 | — | 2.55 | 85.7 | 17.4 | 16.2 | 84.6 |
| Example 5 | $Li(Ni_{0.8}Mn_{0.1}Co_{0.1})O_2$ | EC:EMC = 3:7 volume ratio | 97.3 | 1.5 | 0.2 | 1.0 | — | 2.7 | 88.6 | 16.7 | 15.9 | 87.7 |
| Example 6 | $Li(Ni_{0.8}Mn_{0.1}Co_{0.1})O_2$ | EC:EMC = 3:7 volume ratio | 97 | 1.5 | 1.0 | 0.5 | — | 3 | 87.9 | 15.1 | 15.5 | 86.4 |
| Comparative Example 1 | $Li(Ni_{0.8}Mn_{0.1}Co_{0.1})O_2$ | EC:EMC = 3:7 volume ratio | 97 | — | — | — | VC 3.0 | 3.0 | 57.5 | 49.1 | vent | 67.2 |
| Comparative Example 2 | $Li(Ni_{0.8}Mn_{0.1}Co_{0.1})O_2$ | EC:EMC = 3:7 volume ratio | 98 | — | — | — | $LiBF_4$ | 2.0 | 60.1 | 41.8 | vent | 60.4 |
| Comparative Example 3 | $Li(Ni_{0.8}Mn_{0.1}Co_{0.1})O_2$ | EC:EMC = 3:7 volume ratio | 96 | 1.0 | 1.0 | 3.0 | — | 4.0 | 82.4 | 22.3 | 16.8 | 81.1 |
| Comparative Example 4 | $Li(Ni_{0.8}Mn_{0.1}Co_{0.1})O_2$ | EC:EMC = 3:7 volume ratio | 95.5 | 1.0 | 2.0 | 1.5 | — | 4.5 | 79.8 | 25.7 | 22.1 | 80.6 |
| Comparative Example 5 | $Li(Ni_{0.8}Mn_{0.1}Co_{0.1})O_2$ | EC:EMC = 3:7 volume ratio | 97.85 | 2.0 | 0.05 | 0.1 | — | 2.15 | | Not measurable | | |
| Comparative Example 6 | $Li(Ni_{0.8}Mn_{0.1}Co_{0.1})O_2$ | EC:EMC = 3:7 volume ratio | 97.5 | 1.0 | — | 1.5 | — | 2.5 | 76.5 | 21.7 | 27.9 | 78.5 |
| Comparative Example 7 | $Li(Ni_{0.8}Mn_{0.1}Co_{0.1})O_2$ | EC:EMC = 3:7 volume ratio | 97.5 | — | 1.0 | 1.5 | — | 2.5 | 70.4 | 28.5 | 29.1 | 66.1 |
| Comparative Example 8 | $Li(Ni_{0.8}Mn_{0.1}Co_{0.1})O_2$ | EC:EMC = 3:7 volume ratio | 98 | 1.0 | 1.0 | — | — | 2.0 | 79.6 | 34.8 | 34.3 | 70.5 |
| Comparative Example 9 | $LiCoO_3$ | EC:EMC = 3:7 volume ratio | 98.85 | 1.0 | 0.05 | 0.1 | — | 1.15 | 81.8 | 22.1 | 24.7 | 74.9 |

In Table 1, abbreviations of the compounds are as follows.

EC: ethylene carbonate, EMC: ethylmethyl carbonate, LiDFP: lithium difluorophosphate, TVS: tetravinylsilane, PS: 1,3-propane sultone, VC: vinylene carbonate As illustrated in Table 1, the secondary batteries prepared in Examples 1 to 6 had a capacity retention (%) of 84.2% or more even after 10 weeks storage at a high temperature (60° C.), wherein it may be understood that the capacity retentions were improved in comparison to those of the secondary formed on the surface of the positive electrode was low, it may be understood that the discharge capacity retention (%) after 500 cycles and the capacity retention (%) and resistance increase rate (%) after high-temperature storage were relatively reduced in comparison to those of the secondary battery of Example 1 including the lithium-nickel-manganese-cobalt-based oxide.

With respect to the lithium secondary battery of Comparative Example 5 which included the non-aqueous electrolyte solution containing a relatively excessive amount of lithium difluorophosphate, it was difficult to measure resistance and characteristics of the secondary battery, because the lithium difluorophosphate was not completely dissolved, but was present in the form of precipitates in the non-aqueous electrolyte solution.

The invention claimed is:

1. A lithium secondary battery, comprising:
a positive electrode comprises a positive electrode active material represented by the following Formula 1;
a negative electrode;
a separator disposed between the positive electrode and the negative electrode; and
a non-aqueous electrolyte solution comprising a non-aqueous organic solvent, a lithium salt, and an additive,
wherein the additive is a mixed additive which comprises lithium difluorophosphate, tetravinylsilane, and a sultone compound in a weight ratio of 1:0.05:0.1 to 1:1:1.5:

$$Li(Ni_aCo_bMn_c)O_2 \qquad \text{[Formula 1]}$$

wherein, in Formula 1,
$0.65 < a \leq 0.9$, $0.05 \leq b < 0.2$, $0.05 \leq c < 0.2$, and $a+b+c=1$.

2. The lithium secondary battery of claim 1, wherein the positive electrode active material is a lithium transition metal oxide represented by Formula 1a:

$$Li(Ni_{a1}Co_{b1}Mn_{c1})O_2 \qquad \text{[Formula 1a]}$$

wherein, in Formula 1a,
$0.78 \leq a1 < 0.9$, $0.05 < b1 < 0.17$, $0.05 < c1 < 0.17$, and $a1+b1+c1=1$.

3. The lithium secondary battery of claim 1, wherein the positive electrode active material comprises $Li(Ni_{0.8}Mn_{0.1}Co_{0.1})O_2$.

4. The lithium secondary battery of claim 1, wherein the non-aqueous organic solvent comprises a cyclic carbonate-based organic solvent and a linear carbonate-based organic solvent, wherein a weight ratio of the cyclic carbonate-based organic solvent to the linear carbonate-based organic solvent is in a range of 1:1 to 1:4.

5. The lithium secondary battery of claim 1, wherein the additive comprises the lithium difluorophosphate, the tetravinylsilane, and the sultone compound in a weight ratio of 1:0.07:0.3 to 1:0.7:1.

6. The lithium secondary battery of claim 1, wherein the additive comprises the lithium difluorophosphate, the tetravinylsilane, and the sultone compound in a weight ratio of 1:0.1:0.5 to 1:0.5:0.8.

7. The lithium secondary battery of claim 1, wherein the sultone compound comprises at least one selected from the group consisting of 1,3-propane sultone, 1,4-butane sultone, and 1,3-propene sultone.

8. The lithium secondary battery of claim 1, wherein the sultone compound is 1,3-propane sultone.

9. The lithium secondary battery of claim 1, wherein an amount of the additive is in a range of 0.1 wt % to 7 wt % based on a total weight of the non-aqueous electrolyte solution.

10. The lithium secondary battery of claim 1, wherein an amount of the additive is in a range of 0.1 wt % to 5 wt % based on a total weight of the non-aqueous electrolyte solution.

11. The lithium secondary battery of claim 1, wherein the non-aqueous electrolyte solution further comprises at least one additional additive selected from the group consisting of vinylene carbonate, ethylene sulfate, trimethylene sulfate, methyl trimethylene sulfate, lithium difluoro(bisoxalato)phosphate, lithium oxalyldifluoroborate, succinonitrile, and $LiBF_4$.

* * * * *